US011310998B2

(12) United States Patent
Bajan

(10) Patent No.: US 11,310,998 B2
(45) Date of Patent: Apr. 26, 2022

(54) MODULAR OBSERVATIONAL BEEHIVE SYSTEM

(71) Applicant: Gervend Bajan, Hamilton (CA)

(72) Inventor: Gervend Bajan, Hamilton (CA)

( * ) Notice: Subject to any disclaimer, the term of this patent is extended or adjusted under 35 U.S.C. 154(b) by 206 days.

(21) Appl. No.: 16/536,808

(22) Filed: Aug. 9, 2019

(65) Prior Publication Data

US 2020/0045941 A1 Feb. 13, 2020

Related U.S. Application Data

(60) Provisional application No. 62/716,736, filed on Aug. 9, 2018.

(51) Int. Cl.
*A01K 55/00* (2006.01)
*A01K 47/06* (2006.01)
*A01K 47/00* (2006.01)

(52) U.S. Cl.
CPC .............. *A01K 55/00* (2013.01); *A01K 47/00* (2013.01); *A01K 47/06* (2013.01)

(58) Field of Classification Search
CPC .......... A01K 47/00; A01K 47/06; A47B 1/08; A47B 2001/005; F16M 11/041; B65D 21/0217; B65D 21/0223
USPC ................ 449/3, 13, 21, 26, 32; 108/78, 79; 248/673, 681, 510, 346.03
See application file for complete search history.

(56) References Cited

U.S. PATENT DOCUMENTS

| | | | | |
|---|---|---|---|---|
| 7,991 A * | 3/1851 | Surles | ................... | A01K 47/06 449/22 |
| 32,259 A * | 5/1861 | Walker | ................... | A01K 47/00 449/34 |
| 114,690 A * | 5/1871 | King | ..................... | A01K 47/00 449/32 |
| 205,339 A * | 6/1878 | Barnes | .................. | A01K 47/06 449/13 |
| 207,731 A * | 9/1878 | Gale | ...................... | A01K 47/06 449/13 |
| 1,146,044 A * | 7/1915 | Wood | .................... | A01K 47/06 449/20 |
| 1,630,856 A * | 5/1927 | Markle | ................. | A01K 47/06 449/21 |

(Continued)

FOREIGN PATENT DOCUMENTS

CN 107173263 A * 9/2017

*Primary Examiner* — Brady W Frazier
*Assistant Examiner* — Zoe Tam Tran
(74) *Attorney, Agent, or Firm* — Boudwin Intellectual Property; Daniel Bouldwin

(57) ABSTRACT

A modular observational beehive system. The system includes a base including an elongated member, a pair of support legs, and a latch affixed to each support leg. A first and second hive module each include a pair of sidewalls, a pair of end walls, an upper wall, and a lower wall defining an interior volume adapted to support a hive frame therein. Openings in the end walls allow for the introduction or removal of bees feed, and honey. The first hive module and the second hive module each include a latch and a hook disposed on each sidewall. Using the latches and hooks, the first hive module is securable to the base, and the second hive module is securable to the top of the first hive module in a stacked configuration. The system can be utilized to provide a compact apiary with transparent sidewalls that allow for user observation.

20 Claims, 6 Drawing Sheets

(56) References Cited

U.S. PATENT DOCUMENTS

| | | | | |
|---|---|---|---|---|
| 2,717,432 | A * | 9/1955 | Willard | A01K 47/02 449/42 |
| 3,071,784 | A * | 1/1963 | Kolb | A01K 47/00 449/6 |
| 3,088,134 | A * | 5/1963 | Abel | A01K 47/00 449/6 |
| 4,007,504 | A * | 2/1977 | West | A01K 47/06 449/13 |
| 4,094,026 | A * | 6/1978 | Simoni | A01K 47/00 449/21 |
| 4,133,065 | A | 1/1979 | Hogg | |
| 4,337,541 | A * | 7/1982 | Brown | A01K 47/06 449/19 |
| 4,367,563 | A * | 1/1983 | Ferguson | A01K 47/06 449/19 |
| 5,628,671 | A * | 5/1997 | Stevens | A01K 67/033 449/14 |
| 5,741,170 | A | 4/1998 | Orletsky et al. | |
| 7,360,262 | B2 * | 4/2008 | Mowery | A61G 7/1015 5/83.1 |
| D641,935 | S | 7/2011 | Sullivan | |
| 8,430,714 | B2 | 4/2013 | Benincasa et al. | |
| 8,485,859 | B2 | 7/2013 | Yildirim | |
| 2008/0026674 | A1 * | 1/2008 | Cook | A01K 51/00 449/2 |
| 2009/0068926 | A1 * | 3/2009 | Venglar | A01K 57/00 449/6 |
| 2011/0306272 | A1 * | 12/2011 | Ferguson | A01K 47/06 449/25 |
| 2014/0375181 | A1 * | 12/2014 | Bar-Erez | B62B 1/12 312/111 |
| 2016/0007576 | A1 | 1/2016 | Murray et al. | |
| 2017/0135323 | A1 * | 5/2017 | Gerogiannis | A01K 47/00 |
| 2017/0208779 | A1 * | 7/2017 | Rubright | A01K 47/02 |
| 2019/0350175 | A1 * | 11/2019 | Robinson | A01K 47/04 |

* cited by examiner

MODULAR OBSERVATIONAL BEEHIVE SYSTEM

CROSS REFERENCE TO RELATED APPLICATIONS

This application claims the benefit of U.S. Provisional Application No. 62/716,736 filed on Aug. 9, 2018. The above identified patent application is herein incorporated by reference in its entirety to provide continuity of disclosure.

BACKGROUND OF THE INVENTION

The present invention relates to modular beehives. More specifically the present invention provides a modular observational beehive system with multiple hive modules that can be secured in a compact, stacked configuration via hooks and latches.

Bees have been cultivated by humans for thousands of years. Honey is a valuable food commodity, and bees themselves are incredibly important to our ecosystem as they pollinate flowers and other plants, allowing them to reproduce. Modular beehives have been developed that allow multiple beehives to be stacked on top of one another. Apiaries, or collections of beehives that produce honey for human consumption, are typically set up in outdoor areas. Typical modular beehives are solid and opaque, meaning their contents cannot be observed until a lid as been removed. These types of beehives allow for unrestricted entrance and exit of the bees, and as such would not be suitable for indoor use. Due to the ongoing crisis of a declining bee population, it is more important than ever for people to understand the benefits and positive aspects of bee cultivation. However, it can be difficult for individuals who live in apartments or otherwise have limited space to cultivate bees. In order to address these concerns, the present invention provides a modular observational beehive system with multiple hive modules that can be secured in a customizable stacked configuration, with transparent windows for viewing the interior contents of each hive module. The present invention therefore provides a compact, self-contained apiary system that can be initially set up with bees and hive frames, and subsequently left alone to produce honey for the user, while the user can introduce feed for the bees and collect the honey via various ports in the hive modules.

In light of the devices disclosed in the known art, it is submitted that the present invention substantially diverges in design elements from the known art, and consequently it is clear that there is a need in the art for an improvement to existing modular beehive devices. In this regard the present invention substantially fulfills these needs.

SUMMARY OF THE INVENTION

In view of the foregoing disadvantages inherent in the known types of modular beehives now present in the prior art, the present invention provides a modular observational beehive system wherein the same can be utilized for providing convenience for the user when cultivating bees in a small space, such as an apartment, for example. The present system includes a base including an elongated member, a pair of support legs, and a latch affixed to each support leg. A first and second hive module each include a pair of sidewalls, a pair of end walls, an upper wall, and a lower wall defining an interior volume adapted to support a hive frame therein. Openings in the end walls allow for the introduction or removal of bees feed, and honey. The first hive module and the second hive module each include a latch and a hook disposed on each sidewall. Using the latches and hooks, the first hive module is securable to the base and the second hive module is securable to the top of the first hive module in a stacked configuration.

One object of the present invention is to provide a modular observational beehive system that includes one or more transparent walls for observing the contents of the hive modules.

Another object of the present invention is to provide a modular observational beehive system with latches and hooks that allow an unlimited number of hive modules to be secured in a stack configuration.

A further object of the present invention is to provide a modular observational beehive system capable of using Langstroth frames, flow frames, or any other suitable type of hive frame.

Yet another object of the present invention is to provide a modular observational beehive system that includes a supporting base that can either support the lowermost hive module or be secured to the uppermost hive module and be utilized as a transport handle.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
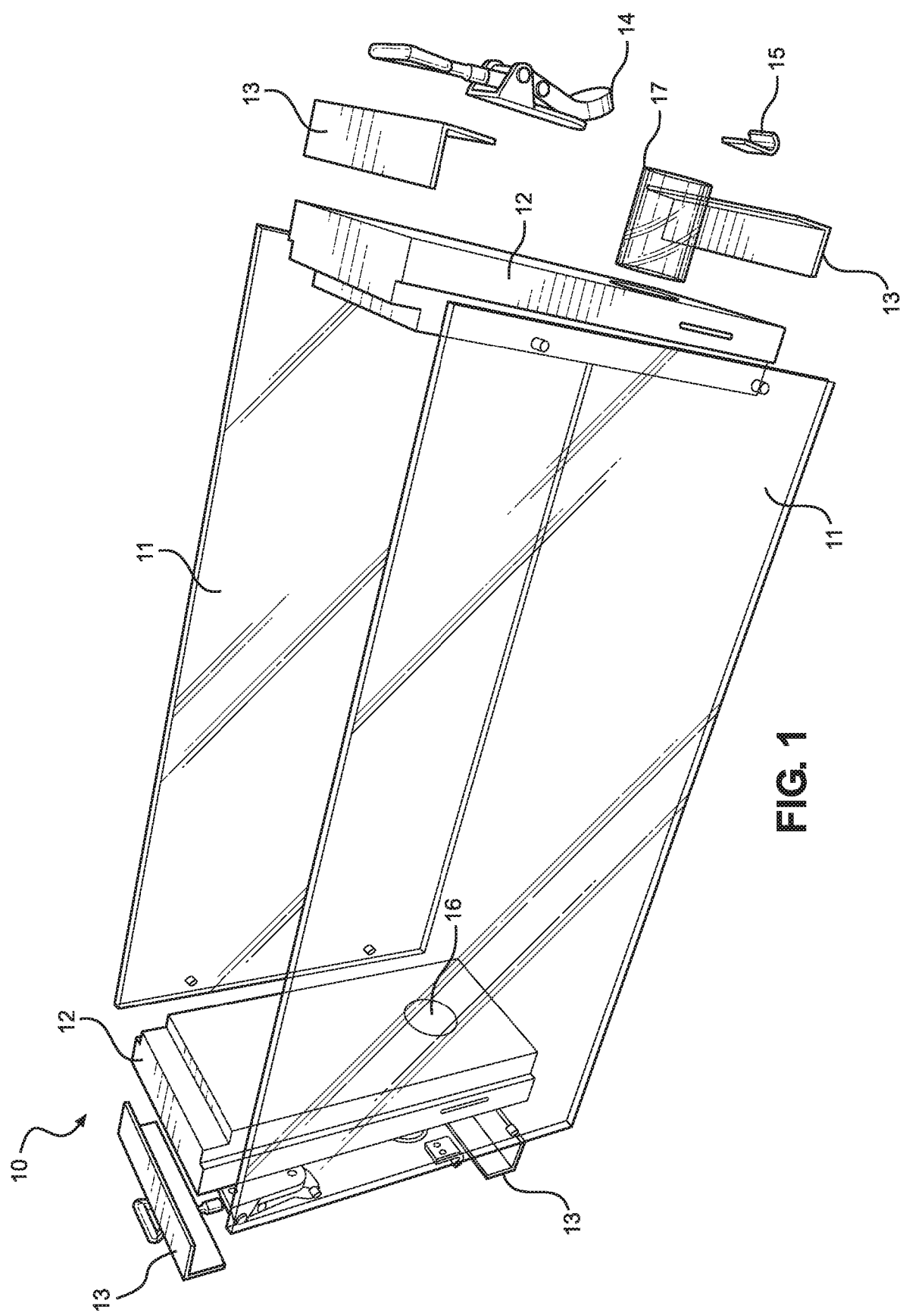
FIG. 1 shows an exploded perspective view of hive module of an embodiment of the modular observational beehive system.

Reference is made herein to the attached drawings. Like reference numerals are used throughout the drawings to depict like or similar elements of the modular observational beehive system. For the purposes of presenting a brief and clear description of the present invention, the preferred embodiment will be discussed as used for cultivating bees in a customizable, compact, indoor apiary system. The figures are intended for representative purposes only and should not be considered to be limiting in any respect.

Referring now to FIG. 1, there is shown an exploded perspective view of a hive module of an embodiment of the modular observational beehive system. The observational beehive system can include any number of hive modules 10, which can be arranged in a stacked configuration. Each hive module 10 includes a pair of sidewalls 11, a pair of end walls 12, an upper wall, and a lower wall defining an interior volume. In the shown embodiment, the sidewalls 11 are transparent so as to allow an individual to observe the contents of the hive module 10. The sidewalls 11, end walls 12, and top and bottom walls are secured with connecting brackets 13 in a box configuration, defining an interior volume which supports hive frames therein. Further, each hive module 10 includes a latch 14 and a corresponding hook 15 which allows multiple hive modules 10 to be secured in the stacked configuration.

Each end wall 12 includes an opening 16 thereon. In the shown embodiment, a port 17 extends outwardly from each opening 16. The opening 16 can be utilized to allow air to flow through the hive module 10, to introduce or remove bees, to introduce food, or to collect honey. In the shown embodiment, the ports 17 are transparent allow observation of contents passing between the port 17 and the interior volume of the hive modules 10.

Figure 2:
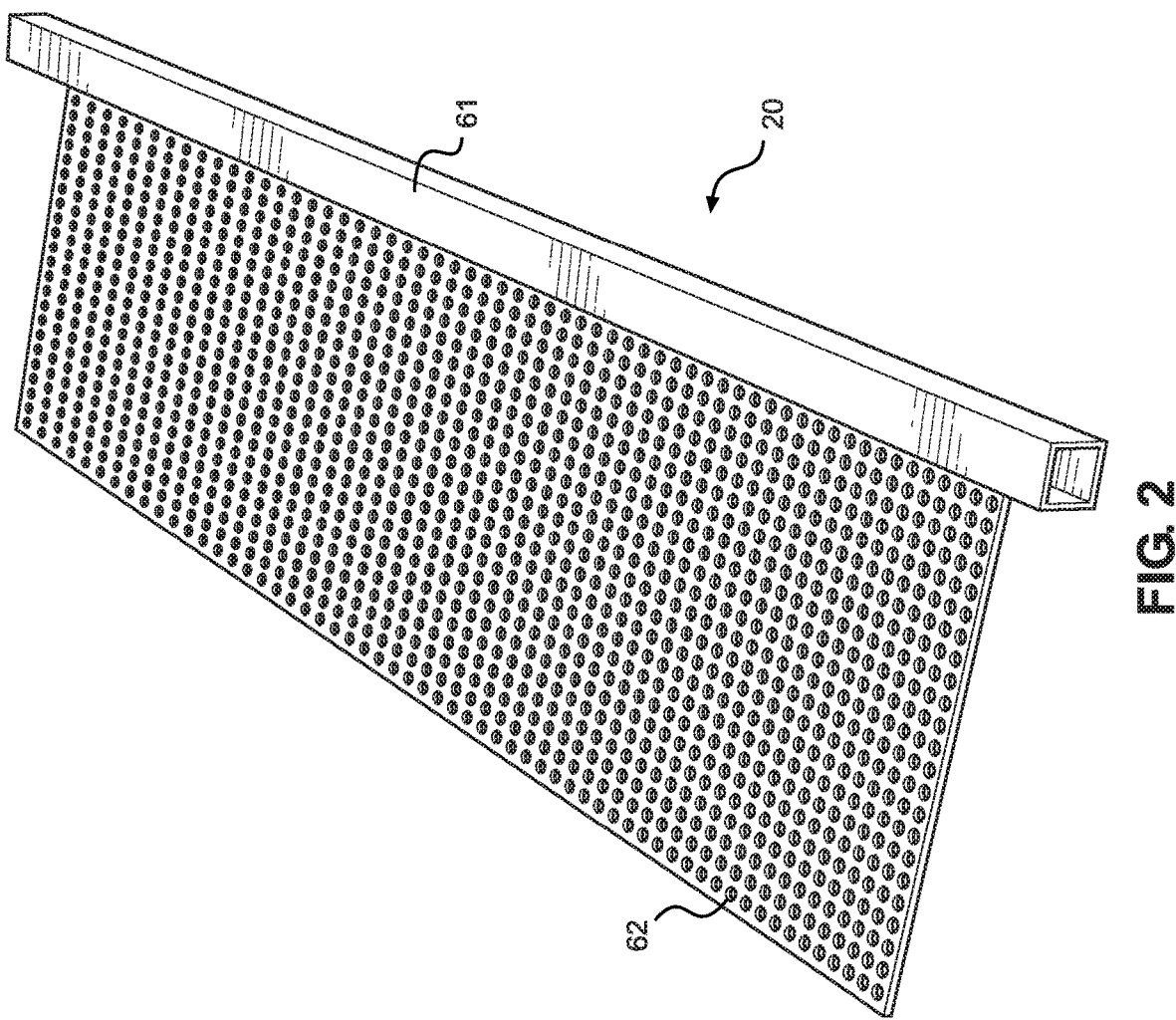
FIG. 2 shows a perspective view of a top wall of a hive module of an embodiment of the modular observational beehive system.

Referring now to FIG. 2, there is shown a perspective view of a top wall of a hive module of an embodiment of the modular observational beehive system. The top and bottom walls are similar in construction. As shown, the top wall 20 includes a grate 62 that allows airflow and an elongated support 61 that allows the top wall 20 to be secured to the hive module via the connecting brackets. The sizes and shapes of the grate openings can be optimized for airflow yet small enough to prevent bees from exiting the hive module.

Figure 3:
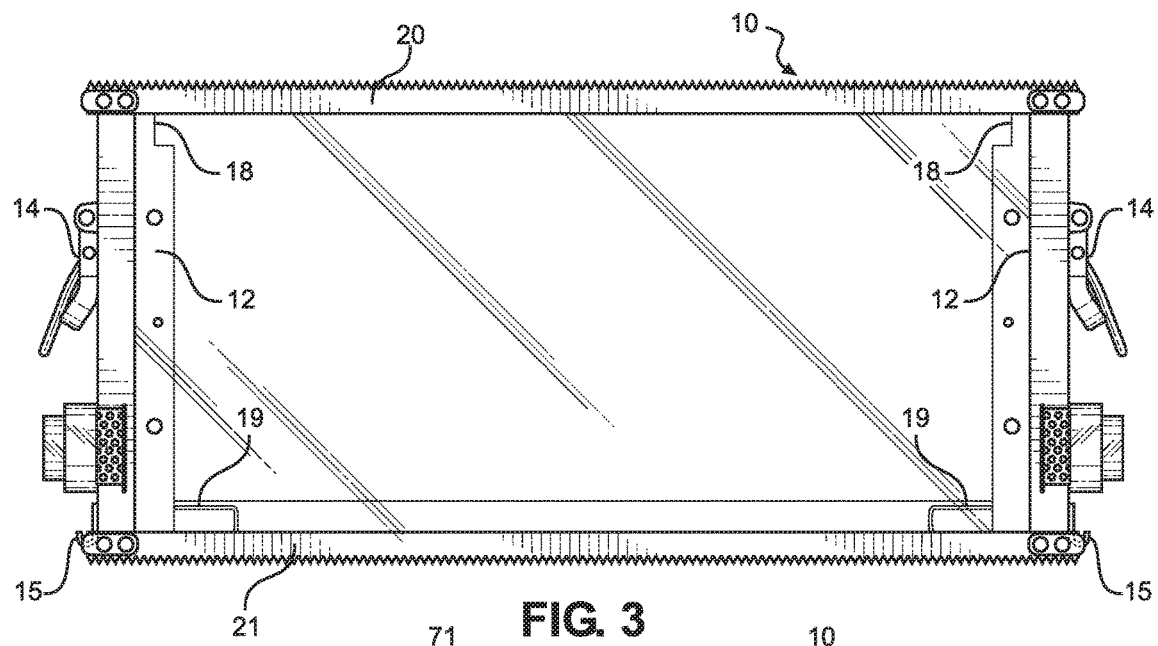
FIG. 3 shows a side elevation view of a hive module of an embodiment of the modular observational beehive system.

Referring now to FIG. 3, there is shown a side elevation view of a hive module of an embodiment of the modular observational beehive system. The hive modules 10 further include upper walls 20 and lower walls 21 that have apertures for airflow, but small enough to exclude a queen bee from transitioning between hive modules. In the shown embodiment, the attachment mechanism includes an upper latch 14 and a lower hook 15. In other embodiments, other types of connectors may be utilized.

Each end wall 12 includes a notch 18 disposed on an upper end thereof, such that the notch 18 is positioned within the interior volume of the hive module 10. The notches 18 are sized to support the upper edges of a hive frame, such that the hive frame is positioned properly in a vertical orientation and stabilized within the interior volume of the hive module 10. In the shown embodiment, the hive module 10 further includes internal support wires 19 which support and stabilize the lower ends of the hive frames when the hive frames are inserted into the interior volume of the hive module 10. The hive module 10 can be specifically configured to support Langstroth frames, flow frames, or any other suitable type of hive frame.

Figure 4:
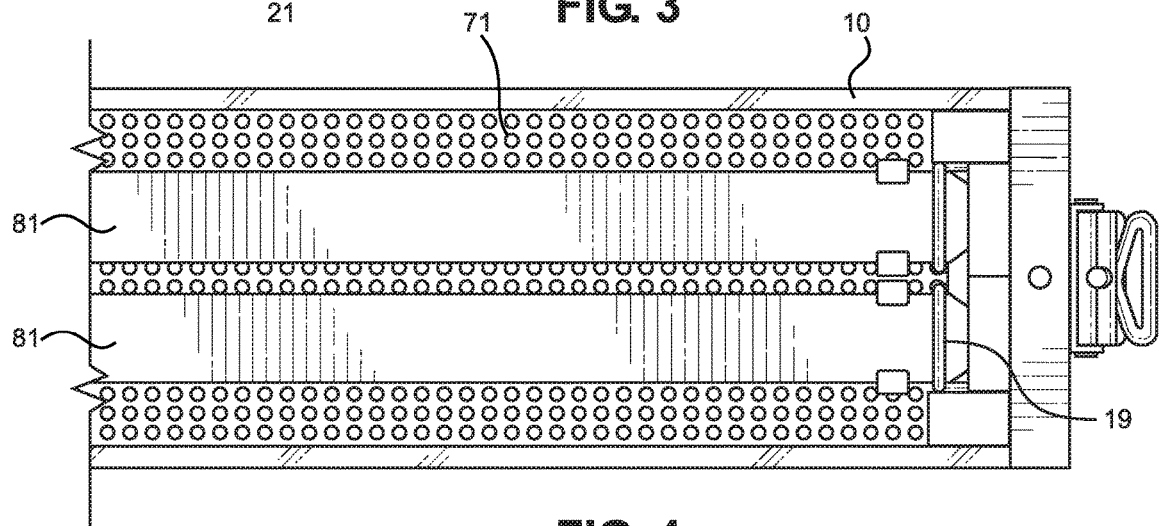
FIG. 4 shows a top plan view of a hive module of an embodiment of the modular observational beehive system showing hive frames inserted therein.

Referring now to FIG. 4, there is shown a top plan view of a hive module of an embodiment of the modular observational beehive system showing hive frames inserted therein. In the shown embodiment, the hive module 10 includes similar support wires 19 disposed within an upper end thereof. The support wires 19 are pivotally affixed at one end to the hive module 10, such that they can be rotated to an open position to allow the hive frames 81 to be placed within the hive module. The support wires 19 can then be rotated downward to contact the upper edge of the hive frame 81. Additionally, a lower end of a hive module 10 may include a queen excluder 71. The queen excluder 71 is a screen with airflow apertures that prevent the queen be from traversing between hive modules 10. As with the top and bottom walls, the size of the grid or screen apertures of the queen excluder 71 may vary.

Figure 5:
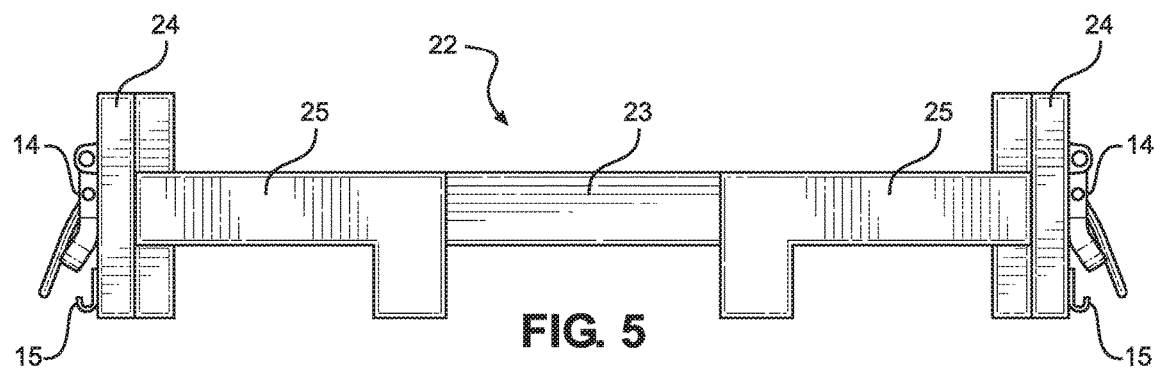
FIG. 5 shows a top plan view of a hive module of an embodiment of the modular observational beehive system showing hive frames inserted therein.

Referring now to FIG. 5, there is shown a side elevation view of a supporting base of an embodiment of the modular observational beehive system. The supporting base 22 includes an elongated member 23 and a pair of supporting legs 24 affixed perpendicularly to the opposing ends of the elongated member 23. An upper latch 14 is affixed to each supporting leg 24, as well as a lower hook 15. The upper latch 14 is adapted to secure to the hook on the lower end of the hive module 10, such that the hive module 10 is effectively secured to the supporting base 22. The lower hook 15 of the supporting base can be secured to an uppermost hive module in a stack via the latch on the uppermost hive module end walls, which allows the supporting base 22 to also function as a handle. In the shown embodiment, the supporting base 22 includes a pair of pivoting support arms 25 disposed on opposing ends thereof. Each support arm 25 is adapted to pivot between a retracted position parallel to and abutting the elongated member 23 and an extended position extending outwardly from and perpendicular to the elongated member 23. The support arms 25 can be retracted to provide a smaller footprint for the system, or extended to provide greater stability and prevent the stacked hive modules from accidentally tipping over.

Figure 6:
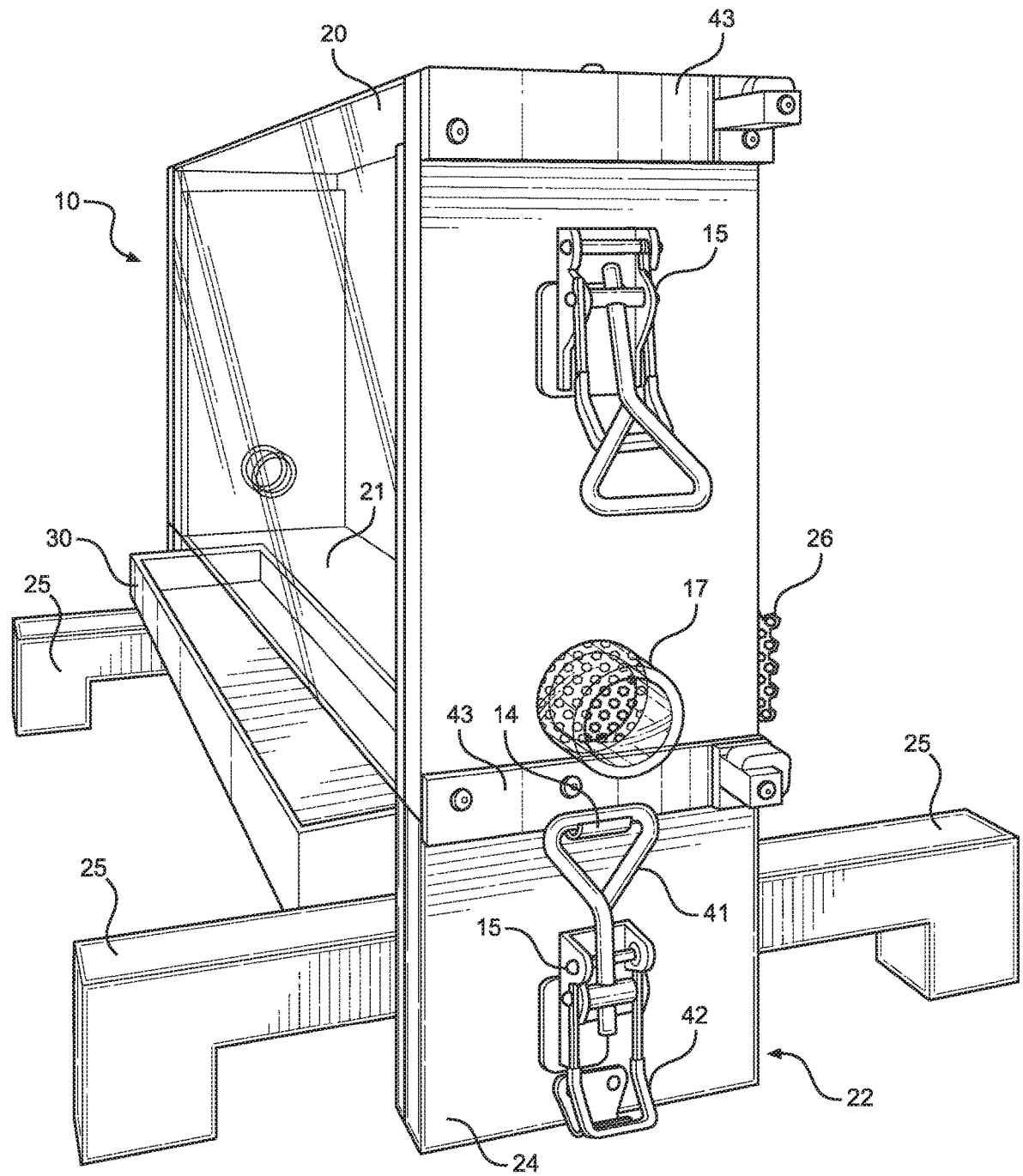
FIG. 6 shows a side elevation view of the base component of an embodiment of the modular observational beehive system.

Referring now to FIG. 6, there is shown a side perspective view of an embodiment of the modular observational beehive showing a hive module secured to a supporting base. In the shown embodiment, the latch 15 on the support leg 24 of the base 22 is secured to a hook 14 on the lower end of the end wall of the hive module 10. Further, the support arms 25 are pivoted outwardly to an extended position, such that they are perpendicular to the elongated member of the base 22, providing additional stability.

A screen 26 is slidably inserted into a channel in each end wall. The screen 26 is positioned between the port 17 and the opening on the end wall in order to selectively prevent access to the interior of the hive module 10, yet still allow air to flow therethrough. The screen 26 also prevents bees from exiting the hive module. In the shown embodiment, the latches 15 include a pivoting catch 41 and a pivoting handle 42. When the handle 42 is rotated downwardly, the catch 41 is pulled downward to frictionally engage the hook 14. In other embodiments, other types of latches or securement mechanisms may be utilized.

In the shown embodiment the hive module 10 is supported on the support legs 22 of the base, which are elevated above the support arms 25. This creates a gap between the lower end of the hive module 10 and the elongated member of the base 22. A collection tray 30 is slidably disposed within this gap. The collection tray 30 is adapted to collect dead bees or other debris that may fall through apertures disposed on the lower wall 21 of the hive module 10. In use, the collection tray 30 can be removed and its contents emptied, then returned to its position beneath the lowermost hive module 10. The lower wall 21 is shown here as transparent to allow for the drawer 30 to be visible in its operation. However, it should be understood that the lower wall 21 can include a grate, grid, or any other structure having a plurality of apertures thereon, as shown in FIG. 2, for example.

Figure 7:
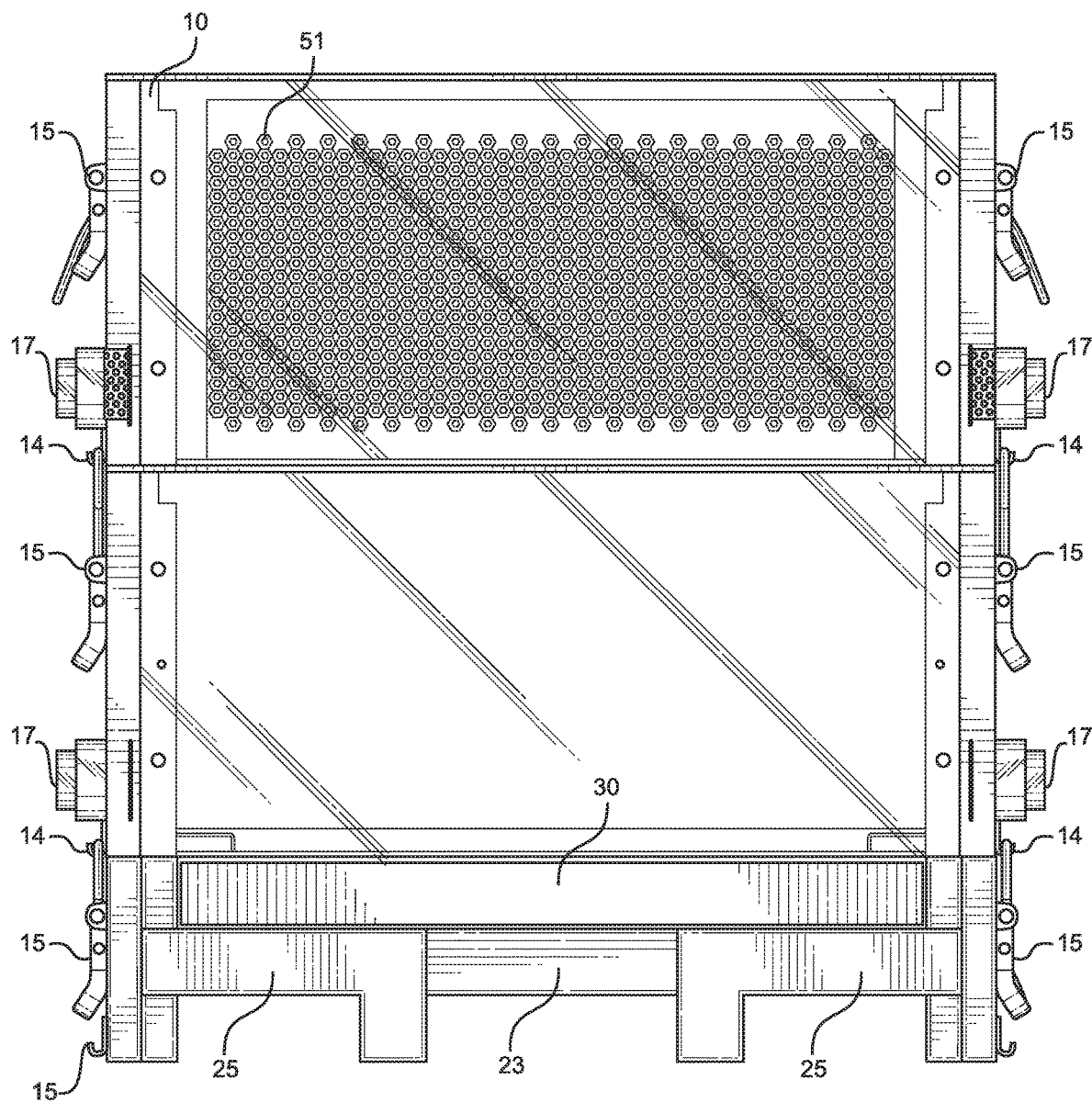
FIG. 7 shows a side elevation view of an embodiment of the modular observational beehive system showing multiple hive modules secured to a supporting base.
Figure 8:
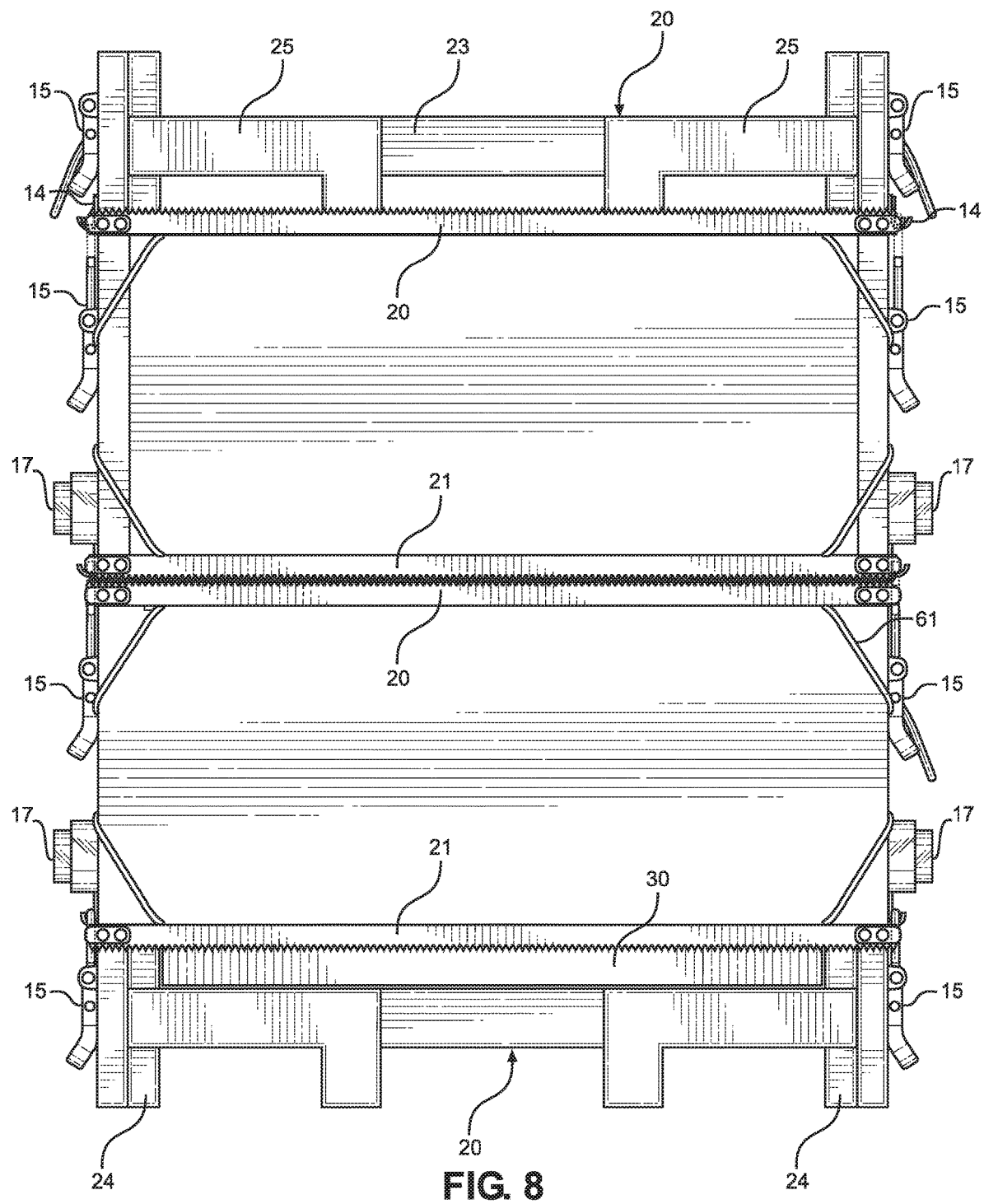
FIG. 8 shows a side elevation view of an embodiment of the modular observational beehive system showing multiple hive modules secured to a supporting base and an additional supporting base secured to the uppermost hive module.

Referring now to FIGS. 7 and 8, there are shown side elevation views of an embodiment of the modular observational beehive showing multiple hive modules secured to a supporting base. The uppermost hive module 10 is shown supporting a hive frame 51 therein. The top and bottom walls prevent a queen bee who typically would be introduced into the lowermost hive module 10 from traversing into the next upper hive module where the hive frame 51 is disposed. The latches 14 and corresponding hooks 15 are utilized to secure any desired number of hive modules 10 in the shown stacked configuration. The openings and ports 17 allow bees to be introduced into the hive, or can be utilized as an outlet for honey that flows downwardly and outwardly from the hive frame 51. The port 17 can be connected to any desired container or tubing assembly to facilitate its various functions such as honey collection and the like.

As illustrated in FIG. 6, an additional supporting base 22 can be secured to the uppermost hive module. The base 22 is securable above the hive module 10 via selective engagement between the latch 15 on each end wall of the upper hive module 10 the hook 15 on each support leg 24 of the base 22. In this y, the elongated member 23 that defines spaced area in which the collection tray 30 rests can be utilized as a grab handle. This allows the entire system to be transported with ease. The modular observational beehive system can therefore be customized by an individual while simultaneously taking up little space, allowing individuals to have their own indoor apiary.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A modular observational beehive system, comprising:
    a base comprising an elongated member, a pair of support legs, and a latch affixed to each support leg;
    a first hive module comprising a pair of sidewalls, a pair of end walls, an upper wall, and a lower wall defining an interior volume;
    a second hive module comprising a pair of sidewalls, a pair of end walls, an upper wall, and a lower wall defining an interior volume;
    the first hive module and the second module each comprising a latch and a hook disposed on each end wall;
    wherein the first hive module is securable to the base and the second hive module is securable to the top of the first hive module in a stacked configuration;
    wherein the base comprises pairs of pivoting support arms disposed on opposing ends thereof, wherein each support arm is disposed adjacent an interior side of each support leg, wherein each support arm is adapted to pivot between a retracted position parallel to and abutting the elongated member and an extended position extending outwardly from and perpendicular to the elongated member.

2. The modular observational beehive system of claim 1, wherein at least one sidewall of each of the first hive module and the second hive module is transparent.

3. The modular observational beehive system of claim 1, further comprising an opening disposed on each end wall of the pair of end walls of the first hive module and the pair of end walls of the second hive module, wherein the openings further include cylindrical ports extending outwardly therefrom, wherein the ports are in fluid communication with the interior volumes of the first and second hive modules.

4. The modular observational beehive system of claim 1, wherein the first hive module and the second hive module each include notches disposed in their respective end walls adapted to support a hive frame thereon.

5. The modular observational beehive system of claim 1, wherein the first hive module and the second hive module each include a pair of screens, wherein each screen is removably insertable within a slot in the end walls between the port and the opening of the end wall.

6. The modular observational beehive system of claim 1, wherein the support arms align with the sidewalls when in the retracted position.

7. The modular observational beehive system of claim 1, wherein the base comprises a hook on each support leg disposed beneath the latch on each support leg, wherein the base is securable above the first hive module or the second hive module via selective engagement between the latch on each end wall of the first hive module or the second hive module and the hook on each support leg of the base.

8. The modular observational beehive system of claim 7, wherein the elongated member of the base defines a carry handle when the base is secured above the first hive module or the second hive module.

9. The modular observational beehive system of claim 1, wherein the first hive module and the second hive module include a plurality of support wires disposed within the interior volume adapted to stabilize a hive frame positioned therein.

10. The modular observational beehive system of claim 1, wherein the top walls and the bottom walls of the first hive module and the second hive module include a plurality of apertures thereon.

11. A modular observational beehive system, comprising:
    a base comprising an elongated member, a pair of support legs, and a latch affixed to each support leg;
    a first hive module comprising a pair of sidewalls, a pair of end walls, an upper wall, and a lower wall defining an interior volume;
    a second hive module comprising a pair of sidewalls, a pair of end walls, an upper wall, and a lower wall defining an interior volume;
    a tray slidably insertable within a recessed area defined by an elongated member of the base and the lower wall of the first hive module;
    the first hive module and the second module each comprising a latch and a hook disposed on each end wall;
    wherein the first hive module is securable to the base and the second hive module is securable to the top of the first hive module in a stacked configuration;

wherein the base comprises pairs of pivoting support arms disposed on opposing ends thereof, wherein each support arm is disposed adjacent an interior side of each support leg, wherein each support arm is adapted to pivot between a retracted position parallel to and abutting the elongated member and an extended position extending outwardly from and perpendicular to the elongated member.

12. The modular observational beehive system of claim 11, wherein the sidewalls of the first hive module and the second hive module are transparent.

13. The modular observational beehive system of claim 11, further comprising an opening disposed on each end wall of the first hive module and the second hive module, wherein the openings further include cylindrical ports extending outwardly therefrom, wherein the ports define a channel in fluid communication with the interior volumes of the hive modules.

14. The modular observational beehive system of claim 11, wherein the first hive module and the second hive module each include notches disposed in their respective end walls adapted to support a hive frame thereon.

15. The modular observational beehive system of claim 11, wherein the first hive module and the second hive module each include a pair of screens, wherein each screen is removably insertable within a slot in the end walls between the port and the opening of the end wall.

16. The modular observational beehive system of claim 1, wherein the support arms align with the sidewalls when in the retracted position.

17. The modular observational beehive system of claim 11, wherein the base comprises a hook on each support leg disposed beneath the latch on each support leg, wherein the base is securable above the first hive module or the second hive module via selective engagement between the latch on each end wall of the first hive module or the second hive module and the hook on each support leg of the base.

18. The modular observational beehive system of claim 17, wherein the elongated member of the base defines a carry handle when the base is secured above the first hive module or the second hive module.

19. The modular observational beehive system of claim 11, wherein the first hive module and the second hive module include a plurality of support wires disposed within the interior volume adapted to stabilize a hive frame positioned therein.

20. The modular observational beehive system of claim 11, wherein the top walls and the bottom walls of the first hive module and the second hive module include a plurality of apertures thereon.

* * * * *